United States Patent
Ying et al.

(10) Patent No.: US 12,323,064 B2
(45) Date of Patent: Jun. 3, 2025

(54) CONTROL METHOD OF ZVS FLYBACK USING TRANSFORMER AUXILIARY WINDING

(71) Applicant: Diodes Incorporated, Plano, TX (US)

(72) Inventors: Zheng Ying, Shanghai (CN); Feng Wang, Shanghai (CN); Bo Chen, Shanghai (CN)

(73) Assignee: Diodes Incorporated, Plano, TX (US)

( * ) Notice: Subject to any disclaimer, the term of this patent is extended or adjusted under 35 U.S.C. 154(b) by 267 days.

(21) Appl. No.: 18/204,274

(22) Filed: May 31, 2023

(65) Prior Publication Data

US 2024/0113631 A1    Apr. 4, 2024

(30) Foreign Application Priority Data

Sep. 29, 2022 (CN) .......................... 202211200958.6

(51) Int. Cl.
*H02M 3/335* (2006.01)
*H02M 1/00* (2007.01)

(52) U.S. Cl.
CPC ..... *H02M 3/33523* (2013.01); *H02M 1/0058* (2021.05); *H02M 1/0006* (2021.05)

(58) Field of Classification Search
CPC ............. H02M 1/0006; H02M 1/0058; H02M 3/335–33523; H02M 3/33569; H02M 3/33592

See application file for complete search history.

(56) References Cited

U.S. PATENT DOCUMENTS

| | | | |
|---|---|---|---|
| 2016/0329814 A1 | 11/2016 | Fahlenkamp et al. | |
| 2020/0083811 A1* | 3/2020 | Koo | H02M 3/3353 |
| 2021/0242789 A1* | 8/2021 | Su | H02M 1/0025 |
| 2022/0038020 A1* | 2/2022 | Guo | H02M 1/0025 |
| 2022/0393603 A1* | 12/2022 | Chen | H02M 3/33576 |
| 2023/0092299 A1* | 3/2023 | Chien | H02M 3/33507 363/13 |

(Continued)

FOREIGN PATENT DOCUMENTS

| | | |
|---|---|---|
| CN | 111917301 A | 11/2020 |
| CN | 113541501 A | 10/2021 |

OTHER PUBLICATIONS

Office Action for Japanese Patent Application No. 2023-115381, mailed on Aug. 28, 2024, 12 pages.

*Primary Examiner* — Fred E Finch, III

(74) *Attorney, Agent, or Firm* — AP3 Law Firm PLLC; Hong Zou

(57) ABSTRACT

A circuit for Flyback switching power supply includes a transformer having a primary winding, a secondary winding and an auxiliary winding, a power switch coupled to a dotted terminal of the primary winding, and a switch. A first terminal of the switch is connected to a non-dotted terminal of the auxiliary winding through a capacitor, a second terminal of the switch and a dotted terminal of the auxiliary winding are connected, respectively, to a ground. A common node of the capacitor and the auxiliary winding is configured to connect to a non-dotted terminal of the primary winding. A control circuit is configured to generate, based on a voltage at the common node of the capacitor and the auxiliary winding, a control signal to control the switch in order to achieve zero voltage switch (ZVS) of the power switch.

20 Claims, 3 Drawing Sheets

(56) References Cited

U.S. PATENT DOCUMENTS

| | | | |
|---|---|---|---|
| 2023/0155516 A1* | 5/2023 | Mednik | H02M 1/342 363/21.06 |
| 2024/0372477 A1* | 11/2024 | Ying | H02M 1/0095 |

* cited by examiner

CONTROL METHOD OF ZVS FLYBACK USING TRANSFORMER AUXILIARY WINDING

CROSS-REFERENCE TO RELATED APPLICATIONS

This patent application claims priority to Chinese Application No. 202211200958.6, filed on Sep. 29, 2022 and entitled "A circuit for Flyback switching power supply ZVS using transformer auxiliary winding," which is hereby incorporated by reference herein as if reproduced in its entirety.

TECHNICAL FIELD

The present disclosure relates to the field of switching power supplies, and in particular embodiments, to a control method and circuit for Flyback switching power supply zero voltage switch (ZVS) using transformer auxiliary winding.

BACKGROUND

In Flyback power supply, the conventional quasi-resonant Flyback (QR) mode or the continuous conduction mode (CCM) often does not work efficiently when supplying power to high-power loads. Currently, the operating efficiency of a Flyback power supply system can be improved by using the zero voltage switch (ZVS) technology.

The ZVS technology generally reduces, to zero, the voltage (Vds) between the drain and source of a metal-oxide-semiconductor field-effect transistor (MOSFET) on the primary side of a transformer, before the main power switch transistor (the MOSFET) is turned on.

When the ZVS technology is used for Flyback power supply, a separate auxiliary winding needs to be added on the primary side of the transformer in order to reverse the excitation current on the primary side of the transformer, and to reversely extract the junction capacitance charge of the MOSFET, so as to reduce the voltage Vds to zero before the MOSFET is turned on, and realize ZVS to improve the operating efficiency of the Flyback power supply system. However, adding the additional auxiliary winding not only increases the cost, but also increases the winding complexity of the transformer and the control complexity of the primary side circuit, thereby reducing the reliability of the product.

Thus, how to realize the ZVS function of the Flyback switching power supply and improve the operating efficiency of the system while reducing the cost is an urgent problem to be solved in the art.

SUMMARY

Technical advantages are generally achieved, by embodiments of this disclosure which describe a control method and circuit for Flyback switching power supply zero voltage switch (ZVS) using transformer auxiliary winding.

An objective of this application is to provide a circuit for realizing ZVS of a Flyback switching power supply by using auxiliary winding, which is used to realize Flyback switching power supply ZVS, to improve working efficiency of the Flyback switching power supply.

In order to solve the above-mentioned technical problems, embodiments of the present application provide a circuit for realizing ZVS of a Flyback switching power supply by using auxiliary winding, where the circuit includes:
  a transformer having a primary winding, a secondary winding and an auxiliary winding;
  a power switch, the power switch being coupled to the dotted terminal of the primary winding, and is controlled by a control circuit of the switching power supply; and
  a ZVS switch module, where a first terminal of the ZVS switch module is connected to one terminal of a ZVS capacitor, the other terminal of the ZVS capacitor is connected to the non-dotted terminal of the auxiliary winding at a first node, and the dotted terminal of the auxiliary winding and a second terminal of the ZVS switch module are respectively connected to a ground. The control circuit generates a ZVS control signal according to the voltage at the first node and controls the ZVS switch module through a control terminal of the ZVS switch module, so as to realize ZVS of the power switch.

Preferably, the ZVS switch module is a field-effect transistor; a first terminal of the field-effect transistor is used as a connection terminal to connect to one terminal of the ZVS capacitor, a second terminal is connected to the ground, and a control terminal is connected to a ZVS control terminal of the control circuit.

Preferably, the circuit for realizing the ZVS of the Flyback switching power supply by using the auxiliary winding also includes: a first resistor and a second resistor; the first resistor and the second resistor are connected in series, and a common node is connected to a voltage sampling terminal of the control circuit, another terminal of the first resistor is connected to the anode of a first diode, and another terminal of the second resistor is connected to the ground.

Preferably, the circuit for realizing the ZVS of the Flyback switching power supply by using the auxiliary winding also includes: a first diode and a first capacitor; a common node at which the cathode of the first diode is connected with one terminal of the first capacitor is connected to a power supply terminal of the control circuit, the other terminal of the first capacitor is connected to the ground, and the anode of the first diode is connected to the non-dotted terminal of the auxiliary winding. When the power switch is turned on, the auxiliary winding, the first diode and the first capacitor form an energy storage circuit to charge the first capacitor, in order for the first capacitor to supply power to the control circuit.

In order to solve the above-mentioned technical problems, embodiments of the present application also provide a Flyback switching power supply, which includes the above-mentioned circuit for realizing the ZVS of the Flyback switching power supply by using the auxiliary winding.

In the circuit for realizing the ZVS of the Flyback switching power supply by using the auxiliary winding provided by the embodiments of the present application, the ZVS capacitor and the ZVS switch module are added based on the existing auxiliary winding of the transformer, and one terminal of the ZVS capacitor is connected to the non-dotted terminal of the auxiliary winding at the first node. Before the primary power switch is turned on, the control circuit generates a ZVS control signal according to the voltage at the first node to turn on the ZVS switch module, so that a resonant current is formed between the auxiliary winding, the ZVS capacitor and the ZVS switch module. The resonant current causes the power switch voltage on the primary side to resonate downwards. Meanwhile, the magnetic coupling between the auxiliary winding and the transformer causes reversal of the excitation current of the primary winding, which reversely extracts the junction capacitance charge of the primary power switch, and thus reduces the voltage Vds of the primary power switch to zero, thereby realizing ZVS of the primary power switch. The embodiments avoid the high cost of adding a separate auxiliary winding on the primary side of the transformer, and improve the working efficiency of the Flyback power supply system.

In addition, embodiments of the present application also provide a Flyback switching power supply, which corresponds to the above-mentioned circuit for realizing the ZVS of the Flyback switching power supply by using the auxiliary winding, and the effect is the same as above.

In accordance with an embodiment, a circuit for Flyback switching power supply is provided. The circuit includes: a transformer comprising a primary winding, a secondary winding and an auxiliary winding; a power switch, coupled to a dotted terminal of the primary winding; a first capacitor; and a first switch comprising a first terminal and a second terminal. The first terminal of the first switch is connected to a non-dotted terminal of the auxiliary winding through the first capacitor, the second terminal of the first switch and a dotted terminal of the auxiliary winding are connected, respectively, to a ground, and a common node of the first capacitor and the auxiliary winding is configured to connect to a non-dotted terminal of the primary winding. The circuit further includes a control circuit that is configured to generate, based on a voltage at the common node of the first capacitor and the auxiliary winding, a control signal, to control the first switch to control zero voltage switch of the power switch.

In accordance with another embodiment, a Flyback switching power supply including a circuit is provided. The circuit includes: a transformer comprising a primary winding, a secondary winding and an auxiliary winding; a power switch, coupled to a dotted terminal of the primary winding; a first capacitor; a first switch comprising a first terminal and a second terminal, wherein the first terminal of the first switch is connected to a non-dotted terminal of the auxiliary winding through the first capacitor, the second terminal of the first switch and a dotted terminal of the auxiliary winding are connected, respectively, to a ground, and a common node of the first capacitor and the auxiliary winding is configured to connect to a non-dotted terminal of the primary winding; and a control circuit configured to generate, based on a voltage at the common node of the first capacitor and the auxiliary winding, a control signal, to control the first switch to perform zero voltage switch of the power switch.

In accordance with another embodiment, a method is provided that is applied in a circuit for Flyback switching power supply. The circuit includes a transformer having a primary winding and an auxiliary winding. The method includes: generating a control signal based on a voltage at a common node of a first capacitor and the auxiliary winding, wherein the circuit further comprises a first switch, a first terminal of the first switch is connected to a non-dotted terminal of the auxiliary winding through the first capacitor, a second terminal of the first switch and a dotted terminal of the auxiliary winding are connected, respectively, to a ground, and the common node of the first capacitor and the auxiliary winding is configured to connect to a non-dotted terminal of the primary winding. The method further includes controlling, based on the control signal, to turn on the first switch of the circuit to perform zero voltage switch of a power switch of the circuit.

BRIEF DESCRIPTION OF THE DRAWINGS

For a more complete understanding of the present disclosure, and the advantages thereof, reference is now made to the following descriptions taken in conjunction with the accompanying drawings. Those of ordinary skill in the art would recognize that the accompanying drawings in the following description are merely some embodiments of the present application, and other drawings may also be obtained based on these drawings without need of creative work. In the drawings.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
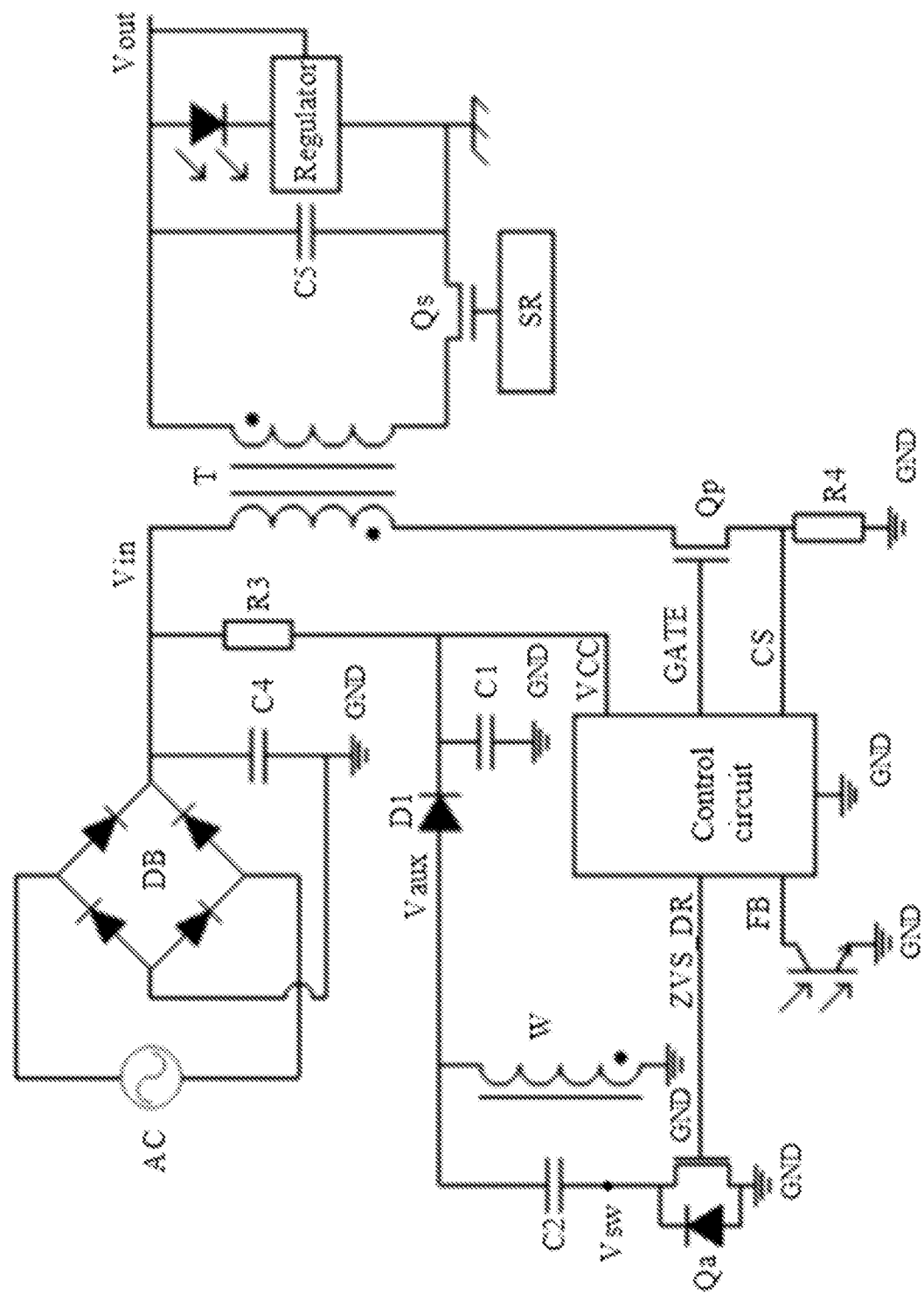
FIG. 1 is a diagram of an example circuit for Flyback switching power supply zero voltage switch (ZVS) using transformer auxiliary winding according to embodiments of the present application.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

The following will clearly and completely describe the technical solutions in embodiments of the present application with reference to the accompanying drawings in embodiments of the present application. It is apparent that the described embodiments are only some, but not all, embodiments of the present application. Based on the embodiments in this application, all other embodiments obtained by persons of ordinary skill in the art without taking creative efforts belong to the protection scope of this application.

Embodiments of this application provide a circuit that utilizes auxiliary winding to realize zero voltage switch (ZVS) of a Flyback switching power supply. On the basis of an existing auxiliary winding, a ZVS capacitor and a ZVS switch module are added. A resonant current is generated by the auxiliary winding, the ZVS capacitor and the ZVS switch module, and the resonant current causes a power switch to generate downward resonance. Meanwhile, the excitation coupling between a transformer and the auxiliary winding causes the excitation current of the primary winding of the transformer to reversely extract the junction capacitance of the primary power switch, thereby realizing ZVS of the Flyback switching power supply, which improves the working efficiency of the system.

For better understanding the solutions of the present application, the present application will be further described in detail in the following using the accompanying drawings and specific embodiment implementations.

In Flyback power supply, the traditional quasi-resonant Flyback (QR) mode or the continuous conduction mode (CCM) often does not work efficiently in cases of providing power to high-power loads. Currently, the zero voltage switch (ZVS) technology can be used to improve the working efficiency of a Flyback power system.

The ZVS technology generally reduces the voltage (Vds) between the drain and source of a metal-oxide-semiconductor field-effect transistor (MOSFET) on the primary side of a transformer to zero, before the main power switch transistor (the MOSFET) is turned on.

When the ZVS technology is used for a Flyback power supply, a separate auxiliary winding needs to be added on the primary side of the transformer to realize the reversal of the excitation current on the primary side of the transformer, and thus to reversely extract the junction capacitance charge of the MOSFET, so as to reduce the voltage Vds to zero before the MOSFET is turned on, and to realize ZVS to improve the operating efficiency of the Flyback power system. However, adding an additional auxiliary winding not only increases the cost, but also increases the winding complexity of the transformer and the control complexity of the primary side circuit, thereby reducing the reliability of the product.

In order to realize the ZVS function of the Flyback switching power supply and improve the working efficiency of the Flyback power supply system while reducing cost, embodiments of the present application provide a circuit for realizing ZVS of the Flyback switching power supply by use of transformer auxiliary winding. Based on the existing technology of utilizing an auxiliary winding for a transformer, a ZVS switch module and a ZVS capacitor are added, and a control terminal of the ZVS switch module is connected to a ZVS control terminal of a control circuit. The control circuit is configured to switch on the ZVS switch module before the power switch on the primary side of the transformer is turned on, to cause generation of a resonant current between the auxiliary winding, the ZVS capacitor and the ZVS capacitor, where the resonant current causes the power switch to resonate downwards. At the same time, the auxiliary winding and the transformer generate excitation to reversely extract the junction capacitance charge of the power switch, thereby realizing ZVS of the power switch.

FIG. 1 is a schematic diagram of an example circuit for implementing Flyback switching power supply ZVS using auxiliary winding according to an embodiment of the present application. As shown in FIG. 1, the circuit includes a transformer T, a power switch Qp, a ZVS switch module Qa and a ZVS capacitor C2. The transformer T includes a primary winding, a secondary winding and an auxiliary winding W. The power switch Qp is coupled to the dotted terminal of the primary winding and is controlled by a control terminal GATE of a control circuit. A first terminal of the ZVS switch module Qa is connected to one terminal of the ZVS capacitor C2 at a node Vsw, the other terminal of the ZVS capacitor C2 is connected to the non-dotted terminal of the auxiliary winding W at a first node Vaux, and the dotted terminal of the auxiliary winding W and a second terminal of the ZVS switch module Qa are connected to a ground, respectively.

According to some embodiments, in operation, before the power switch Qp is turned on, the control circuit generates a ZVS control signal according to the voltage at the first node Vaux to turn on the ZVS switch module Qa, and in this case, a ground current is generated through the auxiliary winding W, the ZVS capacitor C2 and the ZVS switch module Qa. The ground current causes the voltage of the power switch Qp to resonate downwards. At the same time, the excitation coupling generated between the auxiliary winding W and the transformer T causes the excitation current of the primary winding to reversely extract the junction capacitance charge of the power switch Qp. As a result, ZVS of the power switch Qp is achieved, that is, ZVS of the Flyback switching power supply is achieved.

According to some embodiments, in operation, the control circuit may be configured to sample the voltage difference of the auxiliary winding W, to determine the turn-on time of the ZVS switch module Qa using a successive approximation algorithm iteratively, so as to realize the optimal ZVS of the system, and maximize the working efficiency of the system.

In this embodiment circuit for the Flyback switching power supply ZVS by use of the auxiliary winding as shown in FIG. 1, a ZVS capacitor and a ZVS switch module are added based on the existing auxiliary winding of a transformer, and one terminal of the ZVS capacitor is connected to the non-dotted terminal of the auxiliary winding at a first node. Before the primary power switch is turned on, a control circuit generates a ZVS control signal according to the voltage of the first node to turn on the ZVS switch module, so that a resonant current is formed between the auxiliary winding, the ZVS capacitor and the ZVS switch module. The resonant current causes the primary side power switch voltage to resonate downwards. Meanwhile, the magnetic coupling between the auxiliary winding and the transformer cause reversal of the excitation current of the primary winding, which extracts the junction capacitance charge of the primary power switch, and thus reduces the voltage Vds of the primary power switch to zero, thereby realizing ZVS of the primary power switch. The embodiment avoids the high cost of adding a separate auxiliary winding on the primary side of the transformer, and improves the working efficiency of the Flyback power supply system.

Figure 2:
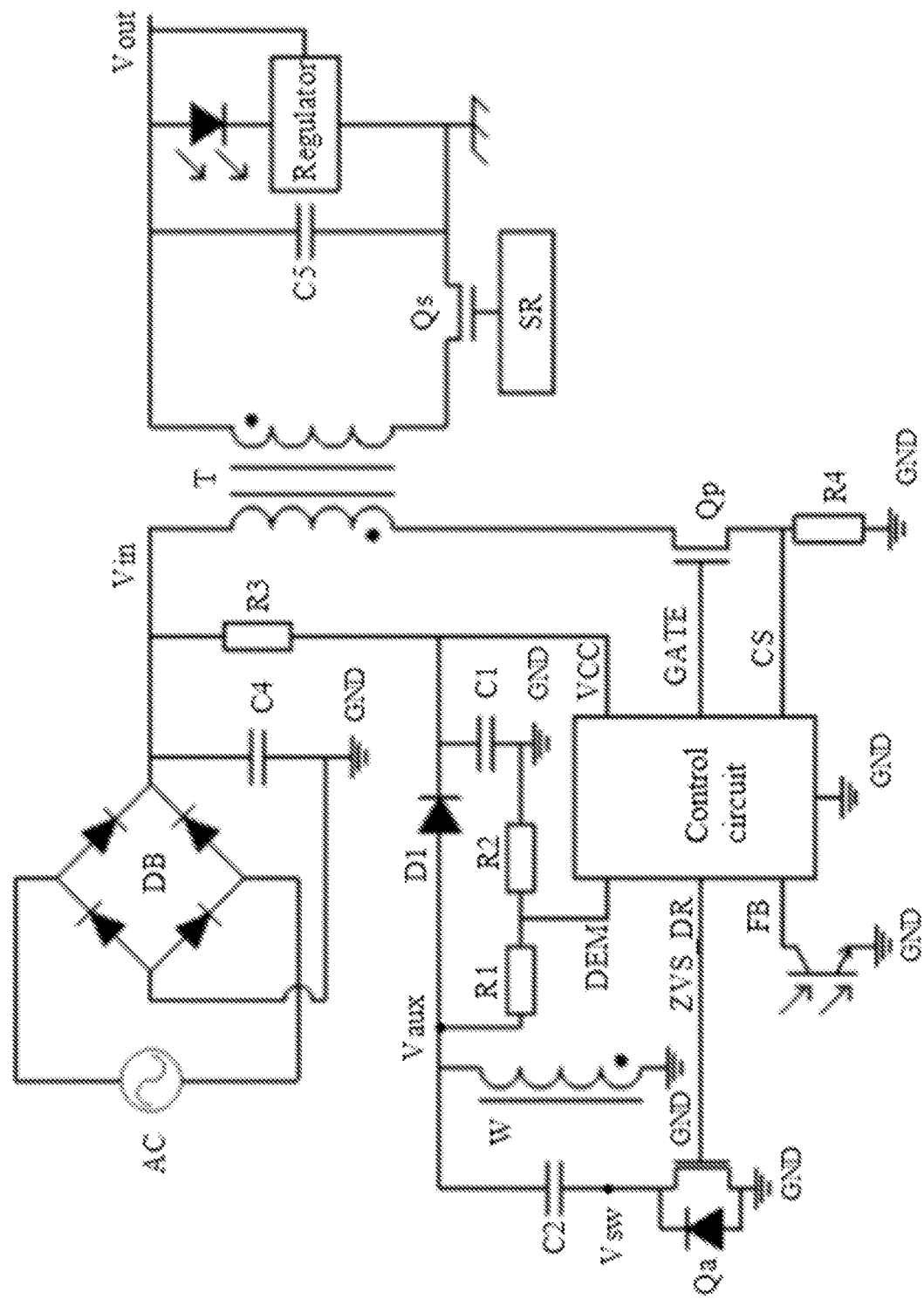
FIG. 2 is a diagram of another example circuit for Flyback switching power supply ZVS using transformer auxiliary winding according to embodiments of the present application.

FIG. 2 is a schematic diagram of an example circuit for Flyback switching power supply ZVS by using auxiliary winding according to another embodiment of the present application. In implementation, a ZVS switch module may be a field-effect transistor, or have a structure including a diode and a transistor connected in parallel, which is not limited in the present application. The field-effect transistor may be preferably used for the ZVS switch module as it includes a body diode, and is easy to use.

When the ZVS switch module is a field-effect transistor, as shown in FIG. 2, a first terminal of the field-effect transistor Qa is used as a connection end to connect to one terminal of a ZVS capacitor C2, a second terminal of the field-effect transistor Qa is connected to a ground, and a control terminal of the field-effect transistor Qa is connected to a control terminal ZVS DR of a control circuit. The control circuit generates a ZVS control signal according to the voltage at a first node Vaux, and controls, through the control terminal of the field-effect transistor Qa, the field-effect transistor Qa to be turned on before a power switch Qp is turned on, which causes generation of a resonant current through the auxiliary winding W, the ZVS capacitor C2 and the field-effect transistor Qa, so as to realize ZVS of the power switch Qp.

In the embodiment circuit for the Flyback switching power supply ZVS by use of the auxiliary winding as shown in FIG. 2, the ZVS switch module is set as a field-effect transistor. The embodiment circuit realizes ZVS of the Flyback switching power supply, has a simple design and is easy to use.

As a preferred embodiment, as shown in FIG. 2, the embodiment circuit for the Flyback switching power supply ZVS by using the auxiliary winding may further include a first resistor R1 and a second resistor R2 connected in series. A common node of the first resistor R1 and the second resistor R2 is connected to a voltage sampling terminal DEM of the control circuit, the other end of the first resistor R1 is connected to the non-dotted terminal of the auxiliary winding W, and the other end of the second resistor R2 is grounded.

In operation, the control circuit is configured to perform divided-voltage sampling on the voltage Vaux at the non-dotted terminal of the auxiliary winding W, with the use of the first resistor R1 and the second resistor R2, and generate a ZVS control signal to control the ZVS switch module Qa to be on or off, so as to realize ZVS of the power switch Qp.

Figure 3:
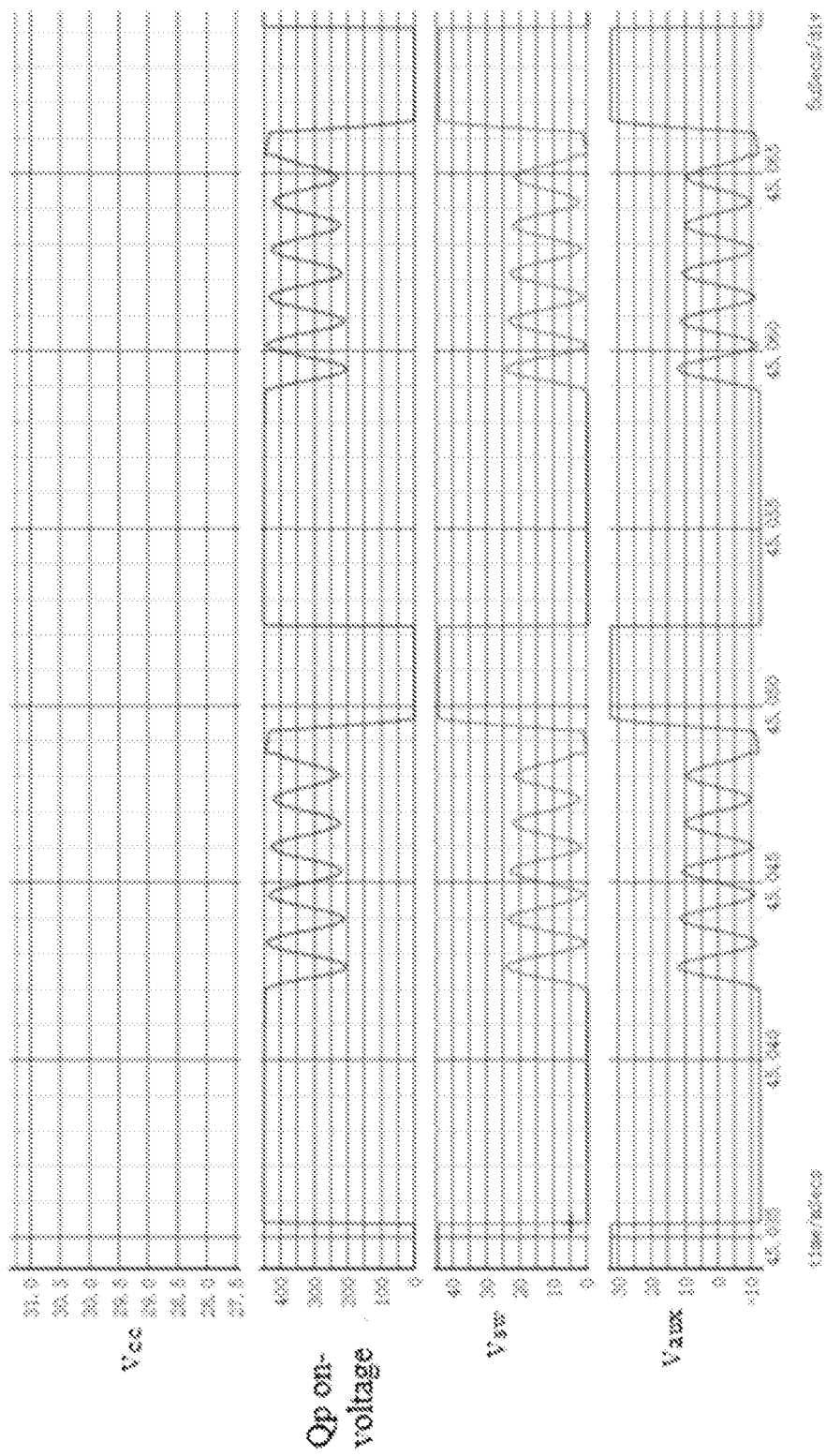
FIG. 3 is a diagram of example voltage waveforms of a circuit for Flyback switching power supply ZVS using transformer auxiliary winding according to embodiments of the present application.

FIG. 3 is a diagram of example voltage waveforms of the embodiment circuit for the Flyback switching power supply ZVS by using the auxiliary winding according to an embodiment of the present application. As shown in FIG. 3, the negative voltage of the Vaux platform represents the output voltage Vout of the switching power supply, the positive voltage of the Vaux platform represents the input voltage Vin of the switching power supply, and the resonant waveform of Vaux may represent the valley. Therefore, in this embodiment, only sampling of Vaux is needed in order to detect information such as the input voltage Vin, the output voltage Vout, and the resonance valley. Further, with the resistors dividing the voltage, the voltage sampling terminal DEM of the control circuit may only need to support 5V.

In the circuit for Flyback switching power supply ZVS using auxiliary winding provided by the embodiment of the present application, the first resistor and the second resistor are added so that the divided voltage sampling may be performed on the voltage at the non-dotted terminal of the auxiliary winding, and the ZVS control signal for realizing ZVS of the power switch may be generated.

On the basis of the above-mentioned embodiments, the example circuit provided by the embodiments of the present application for realizing the Flyback switching power supply ZVS using the auxiliary winding may also include a first diode D1 and a first capacitor C1, as shown in FIG. 2. The negative electrode of the first diode D1 is connected to one terminal of the first capacitor C1, and a common node between the first diode D1 and the first capacitor C1 is connected to a power supply terminal of the control circuit. The other end of the first capacitor C1 is grounded. The positive electrode of the first diode D1 is connected to the non-dotted terminal of the auxiliary winding. When the power switch is turned on, the auxiliary winding, the first diode D1 and the first capacitor C1 form an energy storage circuit to charge the first capacitor C1, so that the first capacitor C1 supplies power to the control circuit.

In operation, when the power switch Qp is turned off, the auxiliary winding W, the ZVS capacitor C2 and the ZVS switch module Qa form a Flyback energy storage circuit to charge the ZVS capacitor C2 to store energy. When the power switch Qp is turned on, the auxiliary winding W, the first diode D1 and the first capacitor C1 form a forward energy storage circuit to charge the first capacitor C1 to store energy. The embodiment circuit in this case is in a forward state of supplying power to the control circuit, and uses the electric energy stored by the ZVS capacitor C2 with flyback and the electric energy stored by first capacitor C1 with forward to supply power to the terminal VCC of the control circuit, which reduces the loss at the terminal VCC of the control circuit.

That is to say, embodiments of the present application realize the Flyback switching power supply ZVS and the function of supplying power to the control circuit by use of the same auxiliary winding, i.e., the same transformer auxiliary winding. This reduces the complexity of the auxiliary winding and circuit design, and thus reduces the overall manufacturing cost of the power supply.

In this example circuit provided by the embodiment of the present application to realize the Flyback switching power supply ZVS using the auxiliary winding, the common node of the first diode and the first capacitor connected in series is connected to the power supply terminal of the control circuit, and the anode of the first diode is connected to the auxiliary winding. In this way, the technical solution provided by the embodiment of the application can realize not only power supply to the control circuit, but also ZVS of the Flyback switching power supply, improving the working efficiency and reliability of the system.

Detailed description of the example circuits for realizing ZVS of the Flyback switching power supply by using auxiliary winding have been provided in the above embodiments. Embodiments of the present application also provide a Flyback switching power supply, which includes the example circuits for Flyback switching power supply ZVS by using auxiliary winding in the above-mentioned embodiments. The beneficial effect of the embodiment Flyback switching power supply corresponds to that of the embodiment circuits for realizing Flyback switching power supply ZVS using auxiliary winding. The effect of the embodiment Flyback switching power supply is the same as above, and will not be repeated herein.

The example circuits for realizing ZVS of the Flyback switching power supply by using auxiliary winding according to embodiments of the present application have been described above in detail. Each embodiment in the disclosure is described in a progressive manner, description of each embodiment includes the differences from other embodiments, and the same and similar aspects of the embodiments can be referred to each other. As devices disclosed in the embodiments correspond to the methods disclosed in the embodiments, the devices are described in a relatively simple way. For the related aspects, please refer to the corresponding description of the methods. It should be pointed out that those ordinarily skilled in the art may make improvements and modifications to the application without departing from the principles of the present application, and these improvements and modifications also fall within the protection scope of the claims of the present application.

It should also be noted that in this disclosure, relational terms such as first and second are only used to distinguish one entity or operation from another entity or operation, and do not necessarily require or imply that any actual relationship or order exists between these entities or operations. Furthermore, the term "include", "comprise" or any other variations thereof is intended to cover a non-exclusive inclusion, such that a process, method, article, or a device including a set of elements not only includes those elements, but also includes other elements not expressly listed, or also includes elements inherent in such a process, method, article, or device. Without further limitations, an element defined by the phrase "include a . . . " does not exclude the presence of additional identical elements in the process, method, article or device including said element.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A circuit for Flyback switching power supply, comprising:
   a transformer comprising a primary winding, a secondary winding and an auxiliary winding;
   a power switch, coupled to a dotted terminal of the primary winding;
   a first capacitor;
   a first switch comprising a first terminal and a second terminal, wherein the first terminal of the first switch is connected to a non-dotted terminal of the auxiliary winding through the first capacitor, the second terminal of the first switch and a dotted terminal of the auxiliary winding are connected, respectively, to a ground, and a common node of the first capacitor and the auxiliary winding is configured to connect to a non-dotted terminal of the primary winding; and
   a control circuit configured to generate a control signal based on a voltage at the common node of the first capacitor and the auxiliary winding, to control the first switch to perform zero voltage switch of the power switch.

2. The circuit of claim 1, wherein the first switch is a field-effect transistor, and the field-effect transistor further comprises a third terminal connected to a zero voltage switch (ZVS) control terminal of the control circuit.

3. The circuit of claim 2, further comprising a first resistor and a second resistor, the first resistor and the second resistor being connected in series between the non-dotted terminal of the auxiliary winding and the ground, and a common node of the first resistor and the second resistor being connected to a voltage sampling terminal of the control circuit.

4. The circuit of claim 3, further comprising a first diode and a second capacitor, wherein a cathode of the first diode is connected to the ground through the second capacitor, a common node of the first diode and the second capacitor is connect to a power supply terminal of the control circuit, and an anode of the first diode is connected to the non-dotted terminal of the auxiliary winding; and
   wherein the auxiliary winding, the first diode and the second capacitor are configured to charge the second capacitor when the power switch is turned on, to supply power to the control circuit.

5. The circuit of claim 2, further comprising a first diode and a second capacitor, wherein a cathode of the first diode is connected to the ground through the second capacitor, a common node of the first diode and the second capacitor is connect to a power supply terminal of the control circuit, and an anode of the first diode is connected to the non-dotted terminal of the auxiliary winding; and
   wherein the auxiliary winding, the first diode and the second capacitor are configured to charge the second capacitor when the power switch is turned on, to supply power to the control circuit.

6. The circuit of claim 1, further comprising a first resistor and a second resistor, the first resistor and the second resistor being connected in series between the non-dotted terminal of the auxiliary winding and the ground, and a common node of the first resistor and the second resistor being connected to a voltage sampling terminal of the control circuit.

7. The circuit of claim 6, further comprising a first diode and a second capacitor, wherein a cathode of the first diode is connected to the ground through the second capacitor, a common node of the first diode and the second capacitor is connect to a power supply terminal of the control circuit, and an anode of the first diode is connected to the non-dotted terminal of the auxiliary winding; and
   wherein the auxiliary winding, the first diode and the second capacitor are configured to charge the second capacitor when the power switch is turned on, to supply power to the control circuit.

8. The circuit of claim 1, further comprising a first diode and a second capacitor, wherein a cathode of the first diode is connected to the ground through the second capacitor, a common node of the first diode and the second capacitor is connect to a power supply terminal of the control circuit, and an anode of the first diode is connected to the non-dotted terminal of the auxiliary winding; and
   wherein the auxiliary winding, the first diode and the second capacitor are configured to charge the second capacitor when the power switch is turned on, to supply power to the control circuit.

9. A Flyback switching power supply, comprising a circuit, the circuit comprising:
   a transformer comprising a primary winding, a secondary winding and an auxiliary winding;
   a power switch, coupled to a dotted terminal of the primary winding;
   a first capacitor;
   a first switch comprising a first terminal and a second terminal, wherein the first terminal of the first switch is connected to a non-dotted terminal of the auxiliary winding through the first capacitor, the second terminal of the first switch and a dotted terminal of the auxiliary winding are connected, respectively, to a ground, and a common node of the first capacitor and the auxiliary winding is configured to connect to a non-dotted terminal of the primary winding; and
   a control circuit configured to generate, based on a voltage at the common node of the first capacitor and the auxiliary winding, a control signal, to control the first switch to perform zero voltage switch of the power switch.

10. The Flyback switching power supply of claim 9, wherein the first switch is a field-effect transistor, and the field-effect transistor further comprises a third terminal connected to a zero voltage switch (ZVS) control terminal of the control circuit.

11. The Flyback switching power supply of claim 10, wherein the circuit further comprises a first resistor and a second resistor, the first resistor and the second resistor being connected in series between the non-dotted terminal of the auxiliary winding and the ground, and a common node of the first resistor and the second resistor being connected to a voltage sampling terminal of the control circuit.

12. The Flyback switching power supply of claim 11, wherein the circuit further comprises a first diode and a second capacitor, a cathode of the first diode is connected to the ground through the second capacitor, a common node of the first diode and the second capacitor is connect to a power supply terminal of the control circuit, and an anode of the first diode is connected to the non-dotted terminal of the auxiliary winding; and
   wherein the auxiliary winding, the first diode and the second capacitor are configured to charge the second capacitor when the power switch is turned on, to supply power to the control circuit.

13. The Flyback switching power supply of claim 10, wherein the circuit further comprises a first diode and a second capacitor, wherein a cathode of the first diode is connected to the ground through the second capacitor, a common node of the first diode and the second capacitor is connect to a power supply terminal of the control circuit, and an anode of the first diode is connected to the non-dotted terminal of the auxiliary winding; and
    wherein the auxiliary winding, the first diode and the second capacitor are configured to charge the second capacitor when the power switch is turned on, to supply power to the control circuit.

14. The Flyback switching power supply of claim 9, wherein the circuit further comprises a first resistor and a second resistor, the first resistor and the second resistor being connected in series between the non-dotted terminal of the auxiliary winding and the ground, and a common node of the first resistor and the second resistor being connected to a voltage sampling terminal of the control circuit.

15. The Flyback switching power supply of claim 14, wherein the circuit further comprises a first diode and a second capacitor, a cathode of the first diode is connected to the ground through the second capacitor, a common node of the first diode and the second capacitor is connect to a power supply terminal of the control circuit, and an anode of the first diode is connected to the non-dotted terminal of the auxiliary winding; and
    wherein the auxiliary winding, the first diode and the second capacitor are configured to charge the second capacitor when the power switch is turned on, to supply power to the control circuit.

16. The Flyback switching power supply of claim 9, wherein the circuit further comprises a first diode and a second capacitor, a cathode of the first diode is connected to the ground through the second capacitor, a common node of the first diode and the second capacitor is connect to a power supply terminal of the control circuit, and an anode of the first diode is connected to the non-dotted terminal of the auxiliary winding; and
    wherein the auxiliary winding, the first diode and the second capacitor are configured to charge the second capacitor when the power switch is turned on, to supply power to the control circuit.

17. A method applied in a circuit for Flyback switching power supply, the circuit comprising a transformer having a primary winding and an auxiliary winding, wherein the method comprises:
    generating a control signal based on a voltage at a common node of a first capacitor and the auxiliary winding, wherein the circuit further comprises a first switch, a first terminal of the first switch is connected to a non-dotted terminal of the auxiliary winding through the first capacitor, a second terminal of the first switch and a dotted terminal of the auxiliary winding are connected, respectively, to a ground, and the common node of the first capacitor and the auxiliary winding is configured to connect to a non-dotted terminal of the primary winding;
    controlling, based on the control signal, to turn on the first switch of the circuit to perform zero voltage switch of a power switch of the circuit.

18. The method of claim 17, further comprising:
    determining a time to turn on the first switch of the circuit based on a voltage difference of the auxiliary winding.

19. The method of claim 17, wherein controlling to turn on the first switch comprises:
    controlling, based on the control signal, to turn on the first switch of the circuit before the power switch is turned on.

20. The method of claim 17, wherein the first switch is a field-effect transistor.

* * * * *